(12) United States Patent
Herbort et al.

(10) Patent No.: US 11,673,819 B2
(45) Date of Patent: Jun. 13, 2023

(54) USE OF ALKYL-TRICHLOROSILANES AND/OR SILSESQUIOXANES FOR THE REMOVAL OF MICROPLASTIC PARTICLES FROM WATER AND/OR A BODY OF WATER

(71) Applicants: Adrian Frank Herbort, Leinefelde-Worbis OT Kirchohmfeld (DE); Katrin Schuhen, Karlsruhe (DE)

(72) Inventors: Adrian Frank Herbort, Leinefelde-Worbis OT Kirchohmfeld (DE); Katrin Schuhen, Karlsruhe (DE)

(73) Assignee: ABCR GMBH, Karlsruhe (DE)

( * ) Notice: Subject to any disclaimer, the term of this patent is extended or adjusted under 35 U.S.C. 154(b) by 352 days.

(21) Appl. No.: 16/977,343

(22) PCT Filed: Feb. 26, 2019

(86) PCT No.: PCT/EP2019/054756
§ 371 (c)(1),
(2) Date: Nov. 24, 2020

(87) PCT Pub. No.: WO2019/166442
PCT Pub. Date: Sep. 6, 2019

(65) Prior Publication Data
US 2021/0070638 A1    Mar. 11, 2021

(30) Foreign Application Priority Data

Mar. 2, 2018    (DE) .......................... 102018203185.1

(51) Int. Cl.
C02F 1/68        (2023.01)
C08G 77/04       (2006.01)
(Continued)

(52) U.S. Cl.
CPC ................. C02F 1/68 (2013.01); B01J 20/22 (2013.01); C02F 1/28 (2013.01); C08G 77/045 (2013.01);
(Continued)

(58) Field of Classification Search
None
See application file for complete search history.

(56) References Cited

U.S. PATENT DOCUMENTS

| | | | |
|---|---|---|---|
| 6,207,264 B1 * | 3/2001 | Robinson | B01J 20/2803 428/317.1 |
| 2003/0159997 A1 | 8/2003 | Markowitz et al. | |
| 2016/0263552 A1 * | 9/2016 | Chu | B01J 20/262 |

FOREIGN PATENT DOCUMENTS

| | | |
|---|---|---|
| DE | 102015207061 A1 | 10/2016 |
| WO | 2018038683 A1 | 3/2018 |

OTHER PUBLICATIONS

Wang (Study of Biofuel Catalyst Modification: Surface Energy of Alkyltrichlorosilane Modified Zeolites, Worchester Polytechnic Institute, 2015, pp. 1-30). (Year: 2015).*

(Continued)

*Primary Examiner* — Clare M Perrin
(74) *Attorney, Agent, or Firm* — Flynn Thiel, P.C.

(57) ABSTRACT

Use of an alkyltrichlorosilane of the following formula I: R—SiCl$_3$, wherein: R represents an alkyl group, Si represents a silicon atom and Cl represents a chlorine atom, and/or of a silsesquioxane of the following formula II: [RSiO$_{3/2}$]$_n$, wherein: R represents an alkyl group, Si represents a silicon atom, O represents an oxygen atom and n represents an integer, for the removal of microplastic particles from water and/or for the treatment of water. Further, a method for the removal of microplastic particles from water and/or for the purification of water is provided, as well as an inclusion and/or intercalation compound, a kit for the (Continued)

removal of microplastic particles from water and/or for the purification of water as well as a water treatment system.

19 Claims, 1 Drawing Sheet

(51) Int. Cl.
- C02F 1/28 (2023.01)
- B01J 20/22 (2006.01)
- C02F 101/30 (2006.01)
- C02F 103/06 (2006.01)
- C02F 103/08 (2006.01)
- B01J 20/28 (2006.01)
- C02F 103/00 (2006.01)

(52) U.S. Cl.
CPC ..... *B01J 20/28047* (2013.01); *C02F 2101/30* (2013.01); *C02F 2103/007* (2013.01); *C02F 2103/06* (2013.01); *C02F 2103/08* (2013.01)

(56) References Cited

OTHER PUBLICATIONS

Herbort Adrian Frank et al., A concept for the removal of microplastics from the marine environment with innovative host-guest relationships, Environmental Science and Pollution Research International, 2016, 24: 11061-11065 (5 pages).

Talvitie Julie et al., Solutions to micorplastic pollution—Removal of microplastics from wastewater effluent with advanced wastewater treatment technologies, Water Research, 2017, 401-407 (7 pages).

Office Action of German Patent Office issued in corresponding German Application No. 10 2018 203 185.1 dated Nov. 13, 2018 (9 pages).

International Search Report with English Translation issued in corresponding International Application No. PCT/EP2019/054756 dated Apr. 18, 2019 (7 pages).

Written Opinion of International Searching Authority issued in corresponding International Application No. PCT/EP2019/054756 dated Apr. 18, 2019 (5 pages).

\* cited by examiner

USE OF ALKYL-TRICHLOROSILANES AND/OR SILSESQUIOXANES FOR THE REMOVAL OF MICROPLASTIC PARTICLES FROM WATER AND/OR A BODY OF WATER

FIELD OF APPLICATION AND BACKGROUND

The invention relates to the use of alkyltrichlorosilanes and/or silsesquioxanes for the removal of microplastic particles from water and/or a body of water and/or for the purification of water and/or a body of water, to a method for the removal of microplastic particles from water and/or a body of water and/or for the purification of water and/or a body of water, to an inclusion and/or intercalation compound, to a kit for the removal of microplastic particles from water and/or a body of water and/or for the purification of water and/or a body of water, as well as to a water treatment system.

The problem of microplastic contamination is increasingly attracting attention in society.

The sources and entry paths for plastics into the environment are manifold. For example, microparticles from cosmetics or washing machine abrasion of synthetic fibers enter the wastewater through direct entry (so-called primary entry). In addition, microparticles are potential carriers of pollutants and bacteria, which may also have pathogenic properties.

Depending on the particle diameter, particle elimination in sewage treatment systems is carried out individually. The removal of particles with a diameter or size >5 mm is usually carried out by means of rake and sand traps. The situation is different for particles which are present in low concentrations and in a size range <5 mm, especially in a size range from 0.01 μm to 1 μm, as these are usually uncharged and therefore do not tend towards ionic interactions.

Due to their small size, these inert micro-particles pass through the purification stages of a wastewater treatment system more easily and partly unhindered, as they can neither be separated by precipitation reagents nor converted into macro-flocs by flocculants. In the case of microplastic particles, an aggravating factor is that they generally have a lower density than water and therefore, in any case, do not tend towards sedimentation. As a result, these particles leave the wastewater treatment system together with the treated wastewater and thus enter the water cycle.

This leads to their distribution in the ecosystem with possibly far-reaching effects (for example bioaccumulation) for animals and humans.

At present, there are a number of possibilities for solid-liquid separation to eliminate particles from water. However, the corresponding methods have limiting factors. Either the effectiveness, as in the case of sedimentation and flocculation, is too low and the method too inflexible. Or, as in the case of depth filtration, microfiltration and ultrafiltration, additional chemicals have to be introduced into the wastewater, which have a demonstrable impact on the environment or prevent efficient secondary material recycling or material recovery. Furthermore, the methods are characterized by high purchase and operating costs and require additional infrastructure.

SUMMARY

The object of the invention is therefore to provide compounds which enable the removal of microplastic particles from water and/or bodies of water and thus the purification of water and/or bodies of water. Furthermore, the object of the invention is to provide a corresponding method, an inclusion compound, a kit and a water treatment system.

According to a first aspect, the invention relates to the use of an alkyltrichlorosilane of the following formula I

$$R\text{—}SiCl_3 \quad \text{(formula I)},$$

wherein
R represents an alkyl group, Si represents a silicon atom and Cl represents a chlorine atom,
for the removal of microplastic particles from water, in particular wastewater and/or process water and/or seepage water and/or drinking water, and/or a body of water and/or for the treatment, in particular purification, of water, in particular wastewater and/or process water and/or seepage water and/or drinking water, and/or a body of water.

Alternatively or in combination, the invention relates, according to a first aspect, to the use of a silsesquioxane, preferably a cage-shaped silsesquioxane, of the following formula II

$$[RSiO_{3/2}]_n \quad \text{(formula II)},$$

wherein
R represents an alkyl group, Si represents a silicon atom, O represents an oxygen atom and n represents an integer, for the removal of microplastic particles from water, in particular wastewater and/or process water and/or seepage water and/or drinking water, and/or a body of water and/or for the treatment, in particular purification, of water, in particular wastewater and/or process water and/or seepage water and/or drinking water, and/or a body of water.

The term "an alkyltrichlorosilane" may mean, for the purposes of the present invention, one alkyltrichlorosilane (singular) or a plurality, in particular a mixture, of different alkyltrichlorosilanes.

The term "a silsesquioxane" may mean, for the purposes of the present invention, one silsesquioxane (singular) or a plurality, in particular a mixture, of different silsesquioxanes.

For the purposes of the present invention, the term "microplastic particles" shall be understood to mean plastic particles or plastic fragments which comprise a plastic or a combination, in particular a mixture (blend), of plastics or which consist of a plastic or a combination, in particular a mixture (blend), of plastics, and have a diameter, in particular a mean diameter, of 100 nm to 5 mm.

For the purposes of the present invention, the term "large microplastic particles" shall be understood to mean plastic particles or plastic fragments with a diameter, in particular a mean diameter, of more than 1 mm to 5 mm.

For the purposes of the present invention, the term "small microplastic particles" shall be understood to mean plastic particles or plastic fragments with a diameter, in particular a mean diameter, of 100 nm to 1 mm.

For the purposes of the present invention, the term "water" shall mean any form of water, usually liquid water, and/or any form of an aqueous liquid, i.e. a liquid containing water. In particular, water in the sense of the present invention may, as mentioned above, be wastewater and/or process water and/or seepage water and/or drinking water.

For the purposes of the present invention, the term "wastewater" shall be understood to mean water which is contaminated by use or which has been altered in its properties or composition. According to the invention, the term "wastewater" shall mean, in particular, grey water and/or rainwater and/or black water and/or yellow water and/or brown water and/or precipitation water and/or, for example, infiltration water resulting from structural damage, which enters the sewerage system.

For the purposes of the present invention (and in accordance with European Standard 12056-1), the term "grey water" shall be understood to mean fecal-free, slightly contaminated wastewater, such as that produced when showering, bathing or washing hands, but also that coming from the washing machine, which can be used for treatment to produce service or process water.

For the purposes of the present invention, the term "rainwater" shall be understood to mean water previously evaporated from precipitation in liquid form, i.e. rain.

The term "black water" shall be understood to mean (in accordance with ISO 6107-7:1997) domestic wastewater without grey water containing fecal solids.

For the purposes of the present invention, the term "yellow water" shall be understood to mean urine and urine with flushing water.

For the purposes of the present invention, the term "brown water" shall be understood to mean wastewater containing only feces, flushing water and toilet paper.

For the purposes of the present invention, the term "process water" shall be understood to mean water which is used for a specific technical, industrial, agricultural or domestic application. Process water, unlike drinking water, is not intended for human consumption, but should meet certain minimum hygiene requirements. In any case, it must meet the technical requirements of the process in question.

For the purposes of the present invention, the term "seepage water" shall be understood to mean underground water which moves downwards under the action of gravity (so-called seepage flow).

For the purposes of the present invention, the term "drinking water" shall be understood to mean any water intended for drinking, cooking, the preparation of food and drink and, in particular, for domestic purposes such as personal hygiene and cleaning, cleaning of objects intended to come into contact with foodstuffs (such as glasses, crockery, cutlery) and cleaning of objects intended to come into contact with the human body on a non-temporary basis (such as clothes and linen).

For the purposes of the present invention, the term "body of water" shall be understood to mean water flowing or standing in nature, in particular freshwater and/or saltwater and/or brackish water. Depending on the location of the body of water, it may be an open body of water, i.e. a body of water above ground, or a closed body of water, i.e. an underground body of water, such as groundwater. The body of water may also be an inland body of water or a sea. In particular, the inland body of water may be a flowing body of water, such as a river (very large flowing body of water which flows into a sea), a stream (large flowing body of water), a brook (small flowing body of water), a canal (watercourse with an artificially created waterbed), a cave river (flowing body of water in a water cave), fissure water, water channels (artificial bodies of water) or large dimensioned structures for water supply and/or disposal (artificial bodies of water), or a still body of water, such as a lake (large accumulation of water), a reservoir (artificial body of water), a natural pond (small and moderately deep body of water without inflow and outflow), a man-made pond (small and moderately deep body of water with inflow and outflow) (artificial body of water), a vernal pond (regularly drying body of water), a puddle (temporary standing water), a cave lake, or a covered reservoir (artificial body of water).

For the purposes of the present invention, the term "freshwater" shall be understood to mean water which, irrespective of its state of aggregation, does not contain any salts or has a salt content (so-called salinity)<(spoken: less than) 0.1% (mass fraction).

For the purposes of the present invention, the term "saltwater" shall mean water with a salt content (salinity) of at least 1% (mass fraction).

For the purposes of the present invention, the term "seawater" shall mean water with a salt content (salinity), in particular mean salt content, of 3.5% (mass fraction).

For the purposes of the present invention, the term "brackish water" shall be understood to mean sea or lake water with a salt content (salinity) of 0.1% to <1% (mass fraction).

For the purposes of the present invention, the term "sea" shall be understood to mean interconnected bodies of water of the earth surrounding the continents, including the so-called minor seas, which are more or less separated from the free seas. Examples of minor seas are marginal seas (separation by archipelagos or seamounts), mediterranean seas (separation by archipelagos, mainland or seamounts) and inland seas (connection by a strait).

For the purposes of the present invention, the term "hybrid silica gel" shall be understood to mean a gel, in particular a macromolecular gel, with silicon-oxygen bonds and silicon-carbon bonds. Due to the presence of "inorganic" silicon bonds (silicon-oxygen bonds and/or silicon-oxygen-silicon bonds) and "organic" silicon bonds (silicon-carbon bonds), such a hybrid silica gel can also be called an inorganic-organic hybrid silica gel.

For the purposes of the present invention, the term "inclusion and/or intercalation compound" shall be understood to mean a compound or system comprising a hybrid silica gel and microplastic particles, in particular agglomerated microplastic particles, wherein the hybrid silica gel is formed or produced by reaction of an alkyltrichlorosilane and/or silsesquioxane, in particular of an alkyltrichlorosilane and/or silsesquioxane provided in accordance with the invention, in water or a body of water, and wherein the hybrid silica gel encloses or surrounds the microplastic particles, in particular the agglomerated microplastic particles, at least partially, in particular only partially or completely. Such an inclusion and/or intercalation compound can also be referred to as an agglomeration compound or system in the sense of the present invention, since the resulting inclusion and/or intercalation compound, which will be described in greater detail below, involves an agglomeration of microplastic particles.

The microplastic particles are preferably inert, i.e. unresponsive, and/or hydrophobic, i.e. water-insoluble, microplastic particles.

The microplastic particles may, in principle, have a diameter, especially a mean diameter, of >(spoken: greater than) 1 mm to 5 mm (so-called large microplastic particles) and/or a diameter, especially a mean diameter, of 100 nm to 1 mm (so-called small microplastic particles).

The diameter, in particular the mean diameter, of microplastic particles can be determined, for example, by microscopy or scanning electron microscopy, especially by means of ESEM (Environmental Scanning Electron Microscope).

The invention is based on the surprising finding that alkyltrichlorosilanes and/or silsesquioxanes can be used for the removal or elimination of microplastic particles from water and/or a body of water and thus for the purification of water and/or a body of water. In this case, the alkyl groups of the alkyltrichlorosilanes and/or silsesquioxanes are used with particular advantage to localize microplastic particles distributed in water and/or a body of water in a first step and to agglomerate the localized microplastic particles in a second step. In this respect, the alkyltrichlorosilane provided according to the invention can also be referred to as an agglomeration reagent or former.

The localization step is based on inert-inert (and therefore "adhesive") interactions, especially Van der Waals interactions and/or hydrophobic interactions, between the alkyl group of the alkyltrichlorosilane and/or silsesquioxane and the microplastic particles, especially the surface of the microplastic particles. During the course of the localization step, an accumulation/adsorption of alkyltrichlorosilane molecules and/or silsesquioxane molecules occurs on the surface of the microplastic particles, thereby creating the necessary conditions for a subsequent agglomeration of the localized microplastic particles. By inert-inert interactions, in particular Van der Waals interactions and/or hydrophobic interactions, between the alkyltrichlorosilane molecules and/or silsesquioxane molecules of localized microplastic particles, their agglomeration is induced and in particular supported. The microplastic particles localized and in particular agglomerated in this way are then at least partially, in particular only partially or completely, enclosed by the formation of a hybrid silica gel, whereby a dismigration and/or deagglomeration and/or leaching of the microplastic particles are/is prevented. The enclosure of the microplastic particles can advantageously be accompanied by a further agglomeration of the microplastic particles.

The formation of the hybrid silica gel is based on a hydrolysis of the alkyltrichlorosilane and/or silsesquioxane in water and/or a body of water and a subsequent condensation reaction, in particular in the manner of a sol-gel process.

In the case of alkyltrichlorosilane, hydrolysis of the silicon-chlorine bonds with the release of hydrochloric acid produces alkyl silanol compounds which, due to their low stability and in particular due to catalysis by the hydrochloric acid released, condense rapidly to form siloxane bonds to form a hybrid silica gel, in particular a macromolecular hybrid silica gel. The three labile silicon-chlorine bonds of the alkyltrichlorosilane make it possible to form a three-dimensional hybrid silica gel required for the enclosure of microplastic particles, in particular agglomerated microplastic particles, with particular advantage.

The reaction product ultimately formed in water and/or a body of water can be described as an inclusion and/or intercalation compound, wherein the hybrid silica gel encloses or surrounds the microplastic particles, in particular the agglomerated microplastic particles, at least partially, in particular only partially or completely. The inclusion compounds obtained and thus the microplastic particles enclosed therein, in particular agglomerated microplastic particles, can subsequently be removed from the water and/or the body of water in a cost-effective and efficient manner, for example by means of simple filtration methods, such as rake and/or sand trapping in a wastewater treatment system. Depending on the reactivity of the alkyltrichlorosilane and/or silsesquioxane and/or the reaction or contact time, the inclusion compounds may have variable particle diameters, in particular variable mean particle diameters, for example in a range from 1 cm to 6 cm. After their removal from the water and/or the body of water, the inclusion compounds can, if desired, be broken down and analyzed qualitatively and/or quantitatively and/or the microplastic particles contained therein, in particular agglomerated microplastic particles, can be recycled, for example thermal decomposition (pyrolysis) and/or used as filling material. A further advantage of the inclusion compounds is their ecotoxicological harmlessness.

With regard to the methods described in the previous paragraphs, which form the basis for the removal of microplastic particles from water and/or a body of water, it has further turned out to be particularly surprising that the alkyltrichlorosilanes and/or silsesquioxanes provided according to the invention on the one hand have a sufficient initial stability in water and/or a body of water (in particular due to a positive effect induced by the alkyl group, the so-called +I effect), so that the localization and/or agglomeration steps anticipating successful enclosure of the microplastic particles can take place, and, on the other hand, have sufficient reactivity in water and/or a body of water for enclosure of the microplastic particles to take place due to the formation of a hybrid silica gel, as a result of which a dismigration and/or deagglomeration and/or leaching of the microplastic particles are/is prevented.

A further advantage of alkyltrichlorosilanes is that, due to their reactivity in water and/or a body of water, which is due in particular to catalysis by the hydrochloric acid released during hydrolysis, there is no bioaccumulation of the alkyltrichlorosilane and/or of the silanol compounds formed as intermediates in water and/or a body of water, and therefore alkyltrichlorosilanes can be classified as harmless from an ecotoxicological point of view, or at least to the greatest extent possible.

The alkyltrichlorosilane according to formula I and/or the silsesquioxane according to formula II can be used in particular for the treatment, preferably purification, of municipal wastewater.

In addition, the alkyltrichlorosilane according to formula I and/or the silsesquioxane according to formula II can also be used especially for the treatment, preferably purification, of industrial wastewater. Such wastewaters are often characterized by an extreme pH value. However, since the method responsible for the formation of a (macromolecular) hybrid silica gel structure, in particular the sol-gel method, can be catalyzed both under acidic pH conditions and under alkaline pH conditions, this is irrelevant for the separation of microplastic particles from industrial wastewater.

As mentioned above, the silsesquioxane provided according to the invention is preferably a cage-shaped silsesquioxane, i.e. a silsesquioxane with a cage structure. A cage structure can additionally promote the localization of microplastic particles in water and/or a body of water and thus their removal from water and/or a body of water.

A further advantage of using a silsesquioxane provided according to the invention is that silsesquioxanes are less reactive in water due to slower reaction kinetics compared to alkyltrichlorosilanes, which allows for better reactivity control and thus even better enclosure behavior with respect to microplastic particles. Furthermore, the silsesquioxanes provided according to the invention have an improved minimum durability compared to alkyltrichlorosilanes, which means that larger amounts of silsesquioxanes can also be used.

Furthermore, it is advantageous that the silsesquioxanes provided according to the invention can be classified as ecotoxicologically harmless. Thus, especially when used in a sewage treatment system, no increased safety standards have to be observed.

A further general advantage of using an alkyltrichlorosilane and/or silsesquioxane is that water components in possible applications do not exert any disturbing influence. A partial hydrolysis or prepolymerization of the alkyltrichlorosilane and/or silsesquioxane to a hybrid silica gel can even be beneficial with regard to enclosure behavior with respect to microplastic particles. If partial hydrolysis or prepolymerization is not desired, the alkyltrichlorosilane and/or silsesquioxane can be formulated anhydrously or substantially anhydrously and used anhydrously or substantially anhydrously.

Furthermore, the silsesquioxane may basically be a homo-functionalized silsesquioxane, i.e. a silsesquioxane in which the silicon atoms are each covalently linked to an identical alkyl group, or a heterofunctionalized silsesquioxane, i.e. a silsesquioxane with at least two different alkyl groups.

In an embodiment of the invention, the alkyltrichlorosilane is a carrier-free alkyltrichlorosilane, i.e. an alkyltrichlorosilane which is not bound to a carrier material, such as for example activated carbon or a polyurethane sponge, or, in other words, which is free from a carrier material, such as for example activated carbon or a polyurethane sponge. In particular, the alkyltrichlorosilane may be an alkyltrichlorosilane which is not bound to the surface of a carrier material, in particular neither to an outer surface nor to an inner surface of a carrier material.

In a further embodiment of the invention, the silsesquioxane is a carrier-free silsesquioxane, i.e. a silsesquioxane which is not bound to a carrier material, such as for example activated carbon or a polyurethane sponge, or, in other words, which is free from a carrier material, such as for example activated carbon or a polyurethane sponge. In particular, the silsesquioxane may be a silsesquioxane which is not bound to the surface of a carrier material, in particular neither to an outer surface nor to an inner surface of a carrier material.

In a further embodiment of the invention, R, i.e. the alkyl group R in formula I and/or formula II, is an alkyl group having 1 carbon atom to 16 carbon atoms, in particular 3 carbon atoms to 14 carbon atoms, preferably 4 carbon atoms to 8 carbon atoms.

R, i.e. the alkyl group R in formula I and/or formula II, is particularly preferably an alkyl group having at least 4 carbon atoms. In this regard, it has been shown that a positive inductive effect (+I effect) produced by such an alkyl radical is particularly well able to confer, on a corresponding alkyltrichlorosilane and/or silsesquioxane, an initial stability in water and/or a body of water which is sufficient for the localization and/or agglomeration processes occurring before the enclosure of microplastic particles to take place to a sufficient extent.

Preferably R, i.e. the alkyl group R in formula I and/or formula II, is a linear alkyl group, in particular having at least 4 carbon atoms. The advantage mentioned in the previous paragraph applies accordingly.

Alternatively, it may preferably be that R, i.e. the alkyl group R in formula I and/or formula II, is a branched alkyl group, in particular a mono-branched or multi-branched alkyl group. Preferably, the branched alkyl group has at least 4 carbon atoms. A branched alkyl group has the additional advantage over a linear alkyl group that, due to a stronger steric shielding of the silicon atom as well as a stronger positive inductive effect due to the branching of the alkyl group, the initial stability of a corresponding alkyl trichlorosilane and/or silsesquioxane in water and/or a body of water can be additionally increased, whereby the processes of localization and/or agglomeration of microplastic particles required for the enclosure of microplastic particles can proceed particularly well.

In a further embodiment of the invention, R, i.e. the alkyl group R in formula I and/or formula II, is selected from the group consisting of n-butyl group, isobutyl group (2-methylpropyl group), hexyl group, isohexyl group (4-methylpentyl group), 2,4,4-trimethylpentyl group, n-octyl group, 6-methylheptyl group, nonyl group, decyl group, dodecyl group, tetradecyl group and hexadecyl group.

In particular, R, i.e. the alkyl group R in formula I and/or formula II, may be selected from the group consisting of hexyl group, isohexyl group (4-methylpentyl group), 2,4,4-trimethylpentyl group, n-octyl group, 6-methylheptyl group, nonyl group, decyl group, dodecyl group, tetradecyl group, hexadecyl group, isomers thereof and isomer mixtures thereof.

R, i.e. the alkyl group R in formula I and/or formula II, is preferably selected from the group consisting of n-butyl group, isobutyl group (2-methylpropyl group), n-hexyl group, 2-methylpentyl group, 3-methylpentyl group, 2,2-dimethylbutyl group, 2,3-dimethylbutyl group, n-octyl group, 2-methylheptyl group, 3-methylheptyl group, 4-methylheptyl group, 2,2-dimethylhexyl group, 2,3-dimethylhexyl group, 2,4-dimethylhexyl group, 2,5-dimethylhexyl group, 3,3-dimethylhexyl group, 3,4-dimethylhexyl group, 3-ethylhexyl group, 2,2,3-trimethylpentyl group, 2,2,4-trimethylpentyl group, 2,4,4-trimethylpentyl group, 2,3,3-trimethylpentyl group, 2,3,4-trimethylpentyl group, 3-ethyl-2-methylpentyl group, 3-ethyl-3-methylpentyl group and 2,2,3,3-tetramethylbutyl group.

In a further embodiment of the invention, R, i.e. the alkyl group R in formula I and/or formula II, is selected from the group consisting of n-butyl group, isobutyl group, n-octyl group and 2,4,4-trimethylpentyl group.

In particular, R, i.e. the alkyl group R in formula I and/or formula II, may be selected from the group consisting of n-butyl group, isobutyl group, n-octyl group, 2,4,4-trimethylpentyl group, isomers thereof and isomer mixtures thereof.

R, i.e. the alkyl group R in formula I and/or formula II, is preferably selected from the group consisting of n-butyl group, isobutyl group, n-octyl group, 2-methylheptyl group, 3-methylheptyl group, 4-methylheptyl group, 2,2-dimethylhexyl group, 2,3-dimethylhexyl group, 2,4-dimethylhexyl group, 2,5-dimethylhexyl group, 3,3-dimethylhexyl group, 3,4-dimethylhexyl group, 3-ethylhexyl group, 2,2,3-trimethylpentyl group, 2,2,4-trimethylpentyl group, 2,4,4-trimethylpentyl group, 2,3,3-trimethylpentyl group, 2,3,4-trimethylpentyl group, 3-ethyl-2-methylpentyl group, 3-ethyl-3-methylpentyl group and 2,2,3,3-tetramethylbutyl group.

R, i.e. the alkyl group R in formula I and/or formula II, is particularly preferably an n-butyl group. In other words, according to the invention, it is particularly preferred if the alkyltrichlorosilane according to formula I is n-butyltrichlorosilane and/or the silsesquioxane according to formula II is a silsesquioxane functionalized with n-butyl groups.

Furthermore, it is particularly preferred if R, i.e. the alkyl group R in formula I and/or formula II, is an isobutyl group. In other words, according to the invention, it is furthermore particularly preferred if the alkyltrichlorosilane according to formula I is isobutyltrichlorosilane (2-methylpropyltrichlorosilane) and/or the silsesquioxane according to formula II is a silsesquioxane functionalized with isobutyl groups (2-methylpropyl groups).

Furthermore, it is particularly preferred if R, i.e. the alkyl group R in formula I and/or formula II, is an n-octyl group. In other words, according to the invention, it is furthermore particularly preferred if the alkyl trichlorosilane according to formula I is n-octyltrichlorosilane and/or the silsesquioxane according to formula II is a silsesquioxane functionalized with n-octyl groups.

Furthermore, it is particularly preferred if R, i.e. the alkyl group R in formula I and/or formula II, is a 2,4,4-trimethylpentyl group. In other words, according to the invention, it is furthermore particularly preferred if the alkyltrichlorosilane according to formula I is 2,4,4-trimethylpentyltrichlorosilane, i.e. isooctyltrichlorosilane (CAS: 18379-25-4), and/or the silsesquioxane according to formula II is a silsesquioxane functionalized with 2,4,4-trimethylpentyl groups.

The use of n-butyltrichlorosilane and/or isobutyltrichlorosilane and/or n-octyltrichlorosilane and/or 2,4,4-trimethylpentyltrichlorosilane are/is therefore particularly preferred according to the invention because they are (in each case) characterized on the one hand by an initial stability in water and/or a body of water which is sufficiently high for the execution of the localization and/or aggregation processes described above. Thus, an optimal localization of microplastic particles and in particular the formation of larger agglomerates of microplastic particles and/or the formation of a larger number of microplastic particle agglomerates is/are achievable. On the other hand, especially these alkyltrichlorosilane compounds are characterized by a sufficiently high reactivity to form a hybrid silica gel suitable for the enclosure of microplastic particles based on hydrolysis and condensation reactions in water and/or a body of water.

In a further embodiment of the invention, n in formula II means an integer from 4 to 16, in particular 6 to 14, preferably 6 to 12. In particular, good inert-inert interactions, in particular Van der Waals interactions and/or hydrophobic interactions, to microplastic particles can thus be provided.

In a further embodiment of the invention, n in a formula II means the integer 6, 8, 10 or 12. In other words, it is preferred if the silsesquioxane according to formula II is a hexasilsesquioxane, octasilsesquioxane, decasilsesquioxane or dodecasilsesquioxane. As a result, particularly good inert-inert interactions, in particular Van der Waals interactions and/or hydrophobic interactions, to microplastic particles can thus be provided.

In a further embodiment of the invention, silsesquioxane has the following formula III

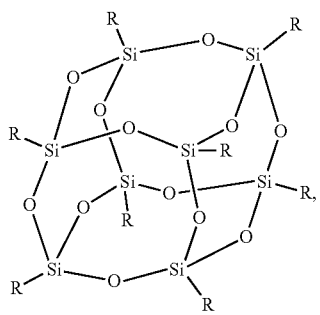

(formula III)

wherein
R represents an alkyl group, Si represents a silicon atom and O represents an oxygen atom.

Preferably the alkyl group R (in formula III) is an alkyl group with 1 carbon atom to 16 carbon atoms, especially 3 carbon atoms to 14 carbon atoms, preferably 4 carbon atoms to 8 carbon atoms.

Furthermore, it is preferred if the alkyl group R (in formula III) is an alkyl group, in particular a linear or branched, in particular mono-branched or multi-branched, alkyl group, preferably having at least 4 carbon atoms.

Furthermore, it is preferred if the alkyl group R (in the formula III) is selected from the group consisting of n-butyl group, isobutyl group (2-methylpropyl group), hexyl group, isohexyl group (4-methylpentyl group), 2,4,4-trimethylpentyl group, n-octyl group, 6-methylheptyl group, nonyl group, decyl group, dodecyl group, tetradecyl group and hexadecyl group.

It is further preferred if the alkyl group R (in formula III) is selected from the group consisting of n-butyl group, isobutyl group, n-octyl group and 2,4,4-trimethylpentyl group. In other words, it is preferred if the silsesquioxane of the present invention is an octa-n-butyl-silsesquioxane, octa-isobutyl-silsesquioxane (octa-2-methylpropyl-silsesquioxane), octa-n-octyl-silsesquioxane or octa-2,4,4-trimethylpentyl-silsesquioxane.

With regard to other features and advantages, in particular with regard to the alkyl group R (in formula III), full reference is made to the previous description. The statements made there, especially with regard to the alkyl group R, apply accordingly to the silsesquioxane according to formula III.

In a further embodiment of the invention, the alkyl group in formula II and/or in formula III comprises at least two different alkyl groups, in particular selected from the group consisting of n-butyl group, isobutyl group (2-methylpropyl group), hexyl group, isohexyl group (4-methylpentyl group), 2,4,4-trimethylpentyl group, n-octyl group, 6-methylheptyl group, nonyl group, decyl group, dodecyl group, tetradecyl group and hexadecyl group. In other words, according to the invention, it may still be preferred if the silsesquioxane according to formula II and/or formula III is a silsesquioxane having at least two different alkyl groups (so-called heterofunctionalized silsesquioxane), wherein the alkyl groups are selected in particular from the group consisting of n-butyl group, isobutyl group (2-methylpropyl group), hexyl group, isohexyl group (4-methylpentyl group), 2,4,4-trimethylpentyl group, n-octyl group, 6-methylheptyl group, nonyl group, decyl group, dodecyl group, tetradecyl group and hexadecyl group.

In a further embodiment of the invention, the alkyltrichlorosilane is a pure substance, i.e. a single type of alkyltrichlorosilane, or a mixture, i.e. a blend, of different alkyltrichlorosilanes. In particular, the alkyltrichlorosilane may be a mixture of isomeric alkyltrichlorosilanes, preferably a mixture of branched isomeric alkyltrichlorosilanes. This makes time-consuming and cost-intensive purification steps unnecessary, which is particularly advantageous. In particular, the alkyltrichlorosilane may be a mixture or blend of at least two different alkyltrichlorosilanes which are preferably selected from the group consisting of n-butyltrichlorosilane, isobutyltrichlorosilane, n-octyltrichlorosilane and 2,4,4-trimethylpentyltrichlorosilane. With regard to other suitable alkyltrichlorosilanes, full reference is made to the description given above.

In a further embodiment of the invention, the silsesquioxane is a pure substance, i.e. a single type of silsesquioxane, or a mixture, i.e. a blend, of different silsesquioxanes. The silsesquioxane may in particular be a mixture of isomeric silsesquioxanes, preferably a mixture of branched isomeric silsesquioxanes. Thus, time-consuming and cost-intensive purification measures can be avoided, which is particularly advantageous. In particular, the silsesquioxane can be a mixture or blend of at least two different silsesquioxanes, which are preferably selected from the group consisting of octa-n-butyl-silsesquioxane, octa-isobutyl-silsesquioxane (octa-2-methylpropyl-silsesquioxane), octa-n-octyl-silsesquioxane and octa-2,4,4-trimethylpentyl-silsesquioxane. As regards other suitable silsesquioxanes, full reference is made to the previous description.

In a further embodiment of the invention, the microplastic particles comprise a plastic or consist of a plastic which is selected from the group consisting of polyethylene (PE) such as low-density polyethylene (LDPE) and/or high-density polyethylene (HDPE), polypropylene (PP), polystyrene (PS), polyvinyl chloride (PVC), polyurethane (PU), polyamide (PA), polycarbonate (PC), polytetrafluoroethylene (PTFE), polyoxymethylene (PMO), acrylonitrile-butadiene-styrene copolymer (ABS), polyethylene terephthalate (PET), polymethyl methacrylate (PMMA), polyacrylonitrile (PAN), copolymers of at least two of said plastics and combinations, in particular mixtures (blends), of at least two of said plastics.

In a further embodiment of the invention, the microplastic particles have a diameter, in particular a mean diameter, of 100 nm to 5 mm, in particular 10 µm to 5 mm, preferably 100 µm to 1 mm.

According to a second aspect, the invention relates to a method for the removal of microplastic particles from water, in particular wastewater and/or process water and/or seepage water and/or drinking water, and/or a body of water and/or for the treatment, in particular purification, of water, in particular wastewater and/or process water and/or seepage water and/or drinking water, and/or a body of water.

The method has the following steps:
a) dosing or adding an alkyltrichlorosilane of the following formula I

R—SiCl$_3$  (formula I), wherein
R represents an alkyl group, Si represents a silicon atom and Cl represents a chlorine atom,
and/or
dosing or adding a silsesquioxane of the following formula II

[RSiO$_{3/2}$]$_n$  (formula II), wherein
R represents an alkyl group, Si represents a silicon atom, O represents an oxygen atom and n represents an integer, to a microplastic particle-containing water, i.e. a water containing microplastic particles, in particular inert and/or hydrophobic microplastic particles, and/or a microplastic particle-containing body of water, i.e. a body of water containing microplastic particles, in particular inert and/or hydrophobic microplastic particles, and
b) removing, from the water and/or the body of water, inclusion and/or intercalation compounds formed after addition of the alkyltrichlorosilane and/or the silsesquioxane, wherein the inclusion and/or intercalation compounds each comprise a hybrid silica gel and microplastic particles, in particular agglomerated microplastic particles, wherein the hybrid silica gel is formed or produced by reaction of the alkyltrichlorosilane and/or the silsesquioxane in the water and/or body of water and the hybrid silica gel encloses or surrounds the microplastic particles, in particular the agglomerated microplastic particles, at least partially, in particular only partially or completely.

Preferably, the alkyltrichlorosilane is a carrier-free alkyltrichlorosilane, i.e. an alkyltrichlorosilane which is not bound to a carrier material, such as for example activated carbon or a polyurethane sponge, or, in other words, which is free from a carrier material, such as for example activated carbon or a polyurethane sponge. In particular, the alkyltrichlorosilane may be an alkyltrichlorosilane which is not bound to the surface of a carrier material, in particular neither to an outer surface nor to an inner surface of a carrier material.

The silsesquioxane is preferably a carrier-free silsesquioxane, i.e. a silsesquioxane which is not bound to a carrier material such as for example activated carbon or a polyurethane sponge or, in other words, which is free from a carrier material such as for example activated carbon or a polyurethane sponge. In particular, the silsesquioxane may be a silsesquioxane which is not bound to the surface of a carrier material, in particular neither to an outer surface nor to an inner surface of a carrier material.

Furthermore, it is preferred if R, i.e. the alkyl group R in formula I and/or formula II, is an alkyl group with 1 carbon atom to 16 carbon atoms, in particular 3 carbon atoms to 14 carbon atoms, preferably 4 carbon atoms to 8 carbon atoms.

Furthermore, it is preferred if R, i.e. the alkyl group R in formula I and/or formula II, is an alkyl group having at least 4 carbon atoms.

Furthermore, it is preferred if R, i.e. the alkyl group R in formula I and/or formula II, is a linear alkyl group, in particular having at least 4 carbon atoms.

Furthermore, it is preferred if R, i.e. the alkyl group R in formula I and/or formula II, is a branched alkyl group, in particular a mono-branched or multi-branched alkyl group. Preferably, the branched alkyl group has at least 4 carbon atoms.

Furthermore, it is preferred if R, i.e. the alkyl group R in formula I and/or formula II, is selected from the group consisting of n-butyl group, isobutyl group (2-methylpropyl group), hexyl group, isohexyl group (4-methylpentyl group), 2,4,4-trimethylpentyl group, n-octyl group, 6-methylheptyl group, nonyl group, decyl group, dodecyl group, tetradecyl group and hexadecyl group.

In particular, R, i.e. the alkyl group R in formula I and/or formula II, may be selected from the group consisting of hexyl group, isohexyl group (4-methylpentyl group), 2,4,4-trimethylpentyl group, n-octyl group, 6-methylheptyl group, nonyl group, decyl group, dodecyl group, tetradecyl group, hexadecyl group, isomers thereof and isomer mixtures thereof.

R, i.e. the alkyl group R in formula I and/or formula II, is preferably selected from the group consisting of n-butyl group, isobutyl group (2-methylpropyl group), n-hexyl group, 2-methylpentyl group, 3-methylpentyl group, 2,2-dimethylbutyl group, 2,3-dimethylbutyl group, n-octyl group, 2-methylheptyl group, 3-methylheptyl group, 4-methylheptyl group, 2,2-dimethylhexyl group, 2,3-dimethylhexyl group, 2,4-dimethylhexyl group, 2,5-dimethylhexyl group, 3,3-dimethylhexyl group, 3,4-dimethylhexyl group, 3-ethylhexyl group, 2,2,3-trimethylpentyl group, 2,2,4-trimethylpentyl group, 2,4,4-trimethylpentyl group, 2,3,3-trimethylpentyl group, 2,3,4-trimethylpentyl group, 3-ethyl-2-methylpentyl group, 3-ethyl-3-methylpentyl group and 2,2,3,3-tetramethylbutyl group.

Furthermore, it is preferred if R, i.e. the alkyl group R in formula I and/or formula II, is selected from the group consisting of n-butyl group, isobutyl group, n-octyl group and 2,4,4-trimethylpentyl group.

In particular, R, i.e. the alkyl group R in formula I and/or formula II, may be selected from the group consisting of n-butyl group, isobutyl group, n-octyl group, 2,4,4-trimethylpentyl group, isomers thereof and isomer mixtures thereof.

R, i.e. the alkyl group R in formula I and/or formula II, is preferably selected from the group consisting of n-butyl group, isobutyl group, n-octyl group, 2-methylheptyl group, 3-methylheptyl group, 4-methylheptyl group, 2,2-dimethylhexyl group, 2,3-dimethylhexyl group, 2,4-dimethylhexyl group, 2,5-dimethylhexyl group, 3,3-dimethylhexyl group, 3,4-dimethylhexyl group, 3-ethylhexyl group, 2,2,3-trimethylpentyl group, 2,2,4-trimethylpentyl group, 2,4,4-trimethylpentyl group, 2,3,3-trimethylpentyl group, 2,3,4-trimethylpentyl group, 3-ethyl-2-methylpentyl group, 3-ethyl-3-methylpentyl group and 2,2,3,3-tetramethylbutyl group.

Furthermore, it is preferred if n in formula II is an integer from 4 to 16, in particular 6 to 14, preferably 6 to 12.

In particular, it is preferred if n in formula II is the integer 6, 8, 10 or 12.

Step a) may be performed, in principle, manually, semi-automatically or (completely) automatically. Step a) is preferably performed semi-automatically or (completely) automatically.

Furthermore, it is preferred if step b) is carried out by means of filtration, especially by means of rake or sand trapping.

Furthermore, it is preferred if step a) and/or step b) are/is carried out in a sewage treatment system, i.e. a wastewater treatment system, in particular in an aeration tank and/or a secondary settling tank thereof.

The sewage treatment system or wastewater treatment system may, in principle, be a central, i.e. stationary, sewage treatment system or wastewater treatment system or a decentralized, i.e. mobile, sewage treatment system or wastewater treatment system, such as for example a container.

For the purposes of the present invention, the term "secondary settling tank" shall be understood to mean a purification stage of a sewage treatment system or wastewater treatment system which usually forms a process unit together with an aeration tank, in which what is known as an activated sludge is separated from the wastewater by settling.

For the purposes of the present invention, the term "aeration tank" shall be understood to mean a purification stage of a sewage treatment system or wastewater treatment system in which wastewater constituents (of fresh wastewater) are biotically oxidatively degraded by aeration of wastewater containing activated sludge.

For the purposes of the present invention, the term "activated sludge" shall be understood to mean an accumulation of microorganisms which decompose organic matter during the aerobic biological treatment of wastewater. The activated sludge consists mainly of bacteria, fungi and protozoa.

Furthermore, it may be preferred if step a) and/or step b) are/is performed before or after a reverse osmosis step.

Furthermore, it may be preferred if step a) and/or step b) are/is carried out before or after a sea salt extraction step.

Furthermore, it is preferred if, before carrying out step a) and/or whilst carrying out step a), the water and/or the body of water are/is set in a rotational movement, in particular at least in portions, preferably only in portions. This has the particular advantage of promoting an anticipatory localization and/or aggregation of the microplastic particles, which is essential for successful enclosure of the microplastic particles.

Furthermore, it is preferable if, before carrying out step a) and/or whilst carrying out step a), a vortex is produced in the water and/or the body of water, in particular at least in portions, preferably only in portions, and the alkyltrichlorosilane and/or the silsesquioxane are/is added into a suction funnel of the vortex. In this way, a localization and/or aggregation of the microplastic particles required for successful enclosure of the microplastic particles can be achieved particularly effectively.

With regard to other features and advantages of the method, in particular the alkyltrichlorosilane and/or silsesquioxane, full reference is made to the explanations given within the scope of the first aspect of the invention. The remarks made there also apply analogously to the method according to the second aspect of invention.

According to a third aspect, the invention relates to an inclusion and/or intercalation compound comprising a hybrid silica gel and microplastic particles, in particular agglomerated microplastic particles, wherein the hybrid silica gel is formed or produced by reaction of an alkyltrichlorosilane of the following formula I

  (formula I), wherein
R represents an alkyl group, Si represents a silicon atom and Cl represents a chlorine atom,
and/or by reaction of a silsesquioxane of the following formula II

  (formula II), wherein
R represents an alkyl group, Si represents a silicon atom, O represents an oxygen atom and n represents an integer,
in water and/or a body of water and the hybrid silica gel encloses or surrounds the microplastic particles, in particular the agglomerated microplastic particles, at least partially, in particular only partially or completely.

Furthermore, it is preferred if R, i.e. the alkyl group R in formula I and/or formula II, is an alkyl group having 1 carbon atom to 16 carbon atoms, in particular 3 carbon atoms to 14 carbon atoms, preferably 4 carbon atoms to 8 carbon atoms.

Furthermore, it is preferred if R, i.e. the alkyl group R in formula I and/or formula II, is an alkyl group having at least 4 carbon atoms.

Furthermore, it is preferred if R, i.e. the alkyl group R in formula I and/or formula II, is a linear alkyl group, in particular having at least 4 carbon atoms.

Furthermore, it is preferred if R, i.e. the alkyl group R in formula I and/or formula II, is a branched alkyl group, in particular a mono-branched or multi-branched alkyl group. Preferably the branched alkyl group has at least 4 carbon atoms.

Furthermore, it is preferred if R, i.e. the alkyl group R in formula I and/or formula II, is selected from the group consisting of n-butyl group, isobutyl group (2-methylpropyl group), hexyl group, isohexyl group (4-methylpentyl group), 2,4,4-trimethylpentyl group, n-octyl group, 6-methylheptyl group, nonyl group, decyl group, dodecyl group, tetradecyl group and hexadecyl group.

Furthermore, it is preferred if R, i.e. the alkyl group R in formula I and/or formula II, is selected from the group consisting of n-butyl group, isobutyl group, n-octyl group and 2,4,4-trimethylpentyl group.

Furthermore, it is preferred if n in formula II is an integer from 4 to 16, in particular 6 to 14, preferably 6 to 12.

In particular, it is preferred if n in formula II is the integer 6, 8, 10 or 12.

The inclusion and/or intercalation compound may have variable particle diameters, in particular variable mean particle diameters, depending on the reactivity of the alkyltrichlorosilane and/or the silsesquioxane and/or depending on the reaction or contact time. For example, the inclusion and/or intercalation compound can have a particle diameter, in particular a mean particle diameter, of 1 cm to 6 cm.

With regard to further features and advantages of the inclusion and/or intercalation compound, reference is also made to the description given so far, in particular to the explanations given in the context of the first aspect of the invention. The remarks made there also apply analogously to the inclusion and/or intercalation compound according to the third aspect of the invention.

According to a fourth aspect, the invention relates to a kit for the removal of microplastic particles from water, in particular wastewater and/or process water and/or seepage water and/or drinking water, and/or a body of water and/or for the treatment, in particular purification, of water, in particular wastewater and/or process water and/or seepage water and/or drinking water, and/or a body of water.

The kit has the following features:
an alkyltrichlorosilane of the following formula I $$R\text{—}SiCl_3 \qquad \text{(formula I)},$$

wherein
R represents an alkyl group, Si represents a silicon atom and Cl represents a chlorine atom,
and/or
a silsesquioxane of formula II below $$[RSiO_{3/2}]_n \qquad \text{(formula II)},$$

wherein
R represents an alkyl group, Si represents a silicon atom, O represents an oxygen atom and n represents an integer.

In addition, the kit has at least one further component, in particular spatially separated from the alkyltrichlorosilane according to formula I and/or the silsesquioxane according to formula II. The further component is preferably an adsorbent, in particular selected from the group consisting of activated carbon, calcium-silica hydrates, polonite, rocks and combinations of at least two of the specified adsorbents.

It is preferred if R, i.e. the alkyl group R in formula I and/or formula II, is an alkyl group with 1 carbon atom to 16 carbon atoms, in particular 3 carbon atoms to 14 carbon atoms, preferably 4 carbon atoms to 8 carbon atoms.

Furthermore, it is preferred if R, i.e. the alkyl group R in formula I and/or formula II, is an alkyl group having at least 4 carbon atoms.

Furthermore, it is preferred if R, i.e. the alkyl group R in formula I and/or formula II, is a linear alkyl group, in particular having at least 4 carbon atoms.

Furthermore, it is preferred if R, i.e. the alkyl group R in formula I and/or formula II, is a branched alkyl group, in particular a mono-branched or multi-branched alkyl group. Preferably the branched alkyl group has at least 4 carbon atoms.

Furthermore, it is preferred if R, i.e. the alkyl group R in formula I and/or formula II, is selected from the group consisting of n-butyl group, isobutyl group (2-methylpropyl group), hexyl group, isohexyl group (4-methylpentyl group), 2,4,4-trimethylpentyl group, n-octyl group, 6-methylheptyl group, nonyl group, decyl group, dodecyl group, tetradecyl group and hexadecyl group.

Furthermore, it is preferred if R, i.e. the alkyl group R in formula I and/or formula II, is selected from the group consisting of n-butyl group, isobutyl group, n-octyl group and 2,4,4-trimethylpentyl group.

Furthermore, it is preferred if n in formula II is an integer from 4 to 16, in particular 6 to 14, preferably 6 to 12.

In particular, it is preferred if n in formula II is the integer 6, 8, 10 or 12.

With regard to further features and advantages of the kit, full reference is also made to the description given so far, in particular to the explanations given within the scope of the first aspect of the invention. The remarks made there also apply analogously to the kit according to the fourth aspect of the invention.

According to a fifth aspect, the invention relates to a water treatment system.

The water treatment system comprises a device for storing and/or supplying a compound for the removal of microplastic particles from water, in particular wastewater and/or process water and/or seepage water and/or drinking water, and/or a body of water, and/or for the treatment, in particular purification, of water, in particular wastewater and/or process water and/or seepage water and/or drinking water, and/or a body of water.

The device contains an alkyltrichlorosilane of the following formula I $$R\text{—}SiCl_3 \qquad \text{(formula I)},$$

wherein
R represents an alkyl group, Si represents a silicon atom and Cl represents a chlorine atom,
and/or a silsesquioxane of formula II below $$[RSiO_{3/2}]_n \qquad \text{(formula II)},$$

wherein
R represents an alkyl group, Si represents a silicon atom, O represents an oxygen atom and n represents an integer.

The water treatment system is preferably a sewage treatment system, i.e. a wastewater treatment system. The sewage treatment system or wastewater treatment system may, in principle, be a centralized, i.e. stationary, sewage treatment system or wastewater treatment system, or a decentralized, i.e. mobile, sewage treatment system or wastewater treatment system, such as a container, for example.

Furthermore, it is preferable if the device is associated with a final purification stage, in particular an activated sludge tank and/or a secondary settling tank, of the water treatment system.

Furthermore, the water treatment system can be a reverse osmosis system.

Furthermore, the water treatment system may be a sea salt extraction system.

Furthermore, the water treatment system can be a drinking water production system.

It is preferred if R, i.e. the alkyl group R in formula I and/or formula II, is an alkyl group having 1 carbon atom to 16 carbon atoms, in particular 3 carbon atoms to 14 carbon atoms, preferably 4 carbon atoms to 8 carbon atoms.

Furthermore, it is preferred if R, i.e. the alkyl group R in formula I and/or formula II, is an alkyl group having at least 4 carbon atoms.

Furthermore, it is preferred if R, i.e. the alkyl group R in formula I and/or formula II, is a linear alkyl group, in particular having at least 4 carbon atoms.

Furthermore, it is preferred if R, i.e. the alkyl group R in formula I and/or formula II, is a branched alkyl group, in particular a mono-branched or multi-branched alkyl group. Preferably the branched alkyl group has at least 4 carbon atoms.

Furthermore, it is preferred if R, i.e. the alkyl group R in formula I and/or formula II, is selected from the group consisting of n-butyl group, isobutyl group (2-methylpropyl group), hexyl group, isohexyl group (4-methylpentyl group), 2,4,4-trimethylpentyl group, n-octyl group, 6-methylheptyl group, nonyl group, decyl group, dodecyl group, tetradecyl group and hexadecyl group.

Furthermore, it is preferred if R, i.e. the alkyl group R in formula I and/or formula II, is selected from the group consisting of n-butyl group, isobutyl group, n-octyl group and 2,4,4-trimethylpentyl group.

Furthermore, it is preferred if n in formula II is an integer from 4 to 16, in particular 6 to 14, preferably 6 to 12.

In particular, it is preferred if n in formula II is the integer 6, 8, 10 or 12.

With regard to further features and advantages of the water treatment system, full reference is also made to the explanations given in the description so far, in particular those made within the scope of the first aspect of the invention. The remarks made there apply analogously to the water treatment system according to the fifth aspect of the invention.

Further features and advantages of the invention result from the following description of preferred embodiments in the form of drawings and examples. Individual features can be realized individually or in combination with each other. The examples described below serve only to further explain the invention, without limiting the invention to the disclosure of the examples.

DETAILED DESCRIPTION

Figure 1:
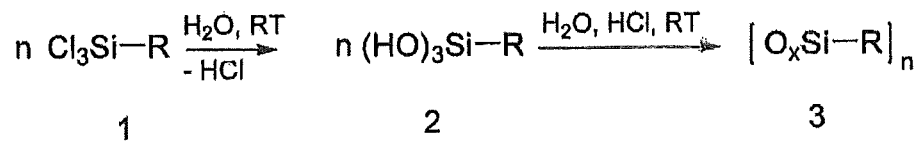
FIG. 1 illustrates the reaction scheme for preparing a hybrid silica gel starting from an alkyltrichlorosilane and water.

FIG. 1: the reaction scheme for preparing a hybrid silica gel starting from an alkyltrichlorosilane and water; and FIGS. 2a-d: the structural formulas of a number of alkyltrichlorosilanes which, according to the invention, are particularly preferred.

FIG. 1 shows schematically the basic reaction scheme underlying the reaction of an alkyltrichlorosilane 1 to form a hybrid silica gel 3, in particular macromolecular hybrid silica gel 3, which is suitable for the enclosure of microplastic particles and/or agglomerated microplastic particles.

On contact with water, the silicon-chlorine bonds of the alkyltrichlorosilane 1 are hydrolyzed to silanol compounds 2 with the formation of hydrochloric acid. Due to a catalytic effect of the hydrochloric acid released, the silanol compounds 2 occurring intermediately rapidly undergo condensation reactions, wherein the hybrid silica gel 3 is produced.

Via the alkyl group of alkyltrichlorosilane 1 it is possible to localize and aggregate microplastic particles distributed in water and/or a body of water. A certain initial stability of the alkyltrichlorosilane is advantageous for this purpose, so that sufficient localization and aggregation of microplastic particles can take place before the enclosure of the microplastic particles/aggregated microplastic particles takes place by formation of the hybrid silica gel, in particular by means of a sol-gel method.

The alkyltrichlorosilane may, in particular, be n-butyltrichlorosilane, isobutyltrichlorosilane, n-octyltrichlorosilane or 2,4,4-trimethylpentyltrichlorosilane.

Figure 2A:
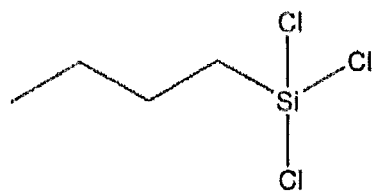
FIGS. 2a-d illustrate the structural formulas of a number of alkyltrichlorosilanes which, according to the invention, are particularly preferred.
Figure 2B:
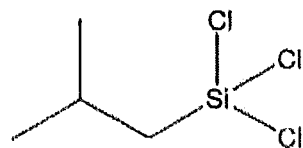
Figure 2C:
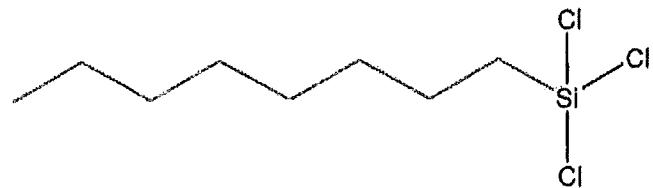
Figure 2D:
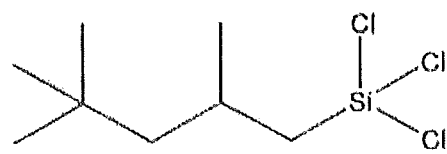

FIG. 2a shows the structural formula of n-butyltrichlorosilane. FIG. 2b shows the structural formula of isobutyltrichlorosilane. FIG. 2c shows the structural formula of n-octyltrichlorosilane. FIG. 2d shows the structural formula of 2,4,4-trimethylpentyltrichlorosilane. The use of these alkyltrichlorosilanes for the removal of microplastic particles from water and/or a body of water and/or for the treatment, in particular purification, of water and/or a body of water is, according to the invention, particularly preferred.

EXAMPLES

1. General Test Specification for the Formation of Agglomeration Compounds 1.1 Laboratory Scale 100 mg microplastic powder (PE, PP or mixtures) (150 μm-300 μm) and 1 l distilled water were placed in a 2 L round-bottom flask and stirred vigorously (24 h swelling process). A small amount (approx. 50-100 μmol) of agglomeration reagent was added slowly. The reaction mixture was stirred at 250 rpm and 25° C. After 20 min, the mixture was filtered and the white solid was dried at 105° C. for 24 h. The silane initially formed small droplets which circulated in the vessel (localization). The droplets accumulated the microplastic particles within 3-4 min. After 2 min gel formation started and a large agglomerate was formed which floated on the water surface (fixation). After 10 min no free PE, PP or mixtures of both were left unbound in the reaction vessel. The pH value of the water was 6-7.

1.2 Pilot System Scale 100 g microplastic powder (PP, PE/PP (1/1) (150 μm-300 μm) and 2000 l process water (secondary clarifier) were filled into a discontinuous 2000 L batch reactor. Subsequently, the mixture was stirred at 250 rpm at room temperature for 24 h (swelling process). The agglomeration method was started by adding agglomeration reagent (approx. 50-100 mmol) and stirring the mixture for 24 h at room temperature and 250 rpm. The mixture was filtered and the agglomerated white solids were dried at 105° C. for 24 h. The agglomerated solids had a diameter of 2-6 cm.

2. General Information

GUR 4150 UHMW-PE particles were purchased from Celanese. Other PE (LDPE, HDPE) and PP microplastic particles were purchased from LyondellBasell.

The alkyltrichlorosilanes and silsesquioxanes listed in table 1 below were used in the experiments described below.

TABLE 1

Alkyltrichlorosilanes and silsesquioxanes used

| Name | CAS. no. |
| --- | --- |
| n-Butyltrichlorosilane | 7521-80-4 |
| isobutyltrichlorosilane | 18169-57-8 |
| n-octyltrichlorosilane | 5283-66-9 |
| isooctyltrichlorosilane | 18379-25-4 |
| isooctyl POSS Cage Mixture | 1472635-27-0 |

Environmental Scanning Electron Microscope (ESEM) images of hybrid silica gels (sample size up to 3 mm) were obtained using an FEI Quanta 250 ESEM (FEI Company, Hillsboro, USA) with low vacuum (60 and 80 Pa). To obtain good quality images, a large field detector (LFD) with an acceleration voltage between 7 and 20 kV was used. The IR spectra were measured with FTIR Nicolet iS10 (Thermo, Dreieich, Germany) and FTIR Nicolet iS5 (Thermo, Dreieich, Germany). Additionally, IR spectra were recorded on VARIAN FT-IR 630 with ATR pike (4000-400 $cm^{-1}$).

3. General Test Specification for the Formation of Agglomeration Compounds 100 mg microplastic powder (PE, PP or mixtures) (150 μm-300 μm) and 1 l distilled water were placed in a 2 l round-bottom flask and stirred vigorously. A small amount ($1*10^{-3}$ mol) of agglomeration reagent (tests 1-6) was added slowly and the reaction mixture was stirred at 250 rpm and 25° C. After 20 min the mixture was filtered and the white solid was dried at 60° C. for 24 h.

4. Tests 4.1 Synthesis of a Microplastic Inclusion Compound Using n-Octyltrichlorosilane 4.1.1 Synthesis of a Hybrid Silica Gel Based on n-Octyltrichlorosilane 1 L distilled water was placed in a 2 L round-bottom flask and stirred vigorously. 43.2 μmol n-octyltrichlorosilane were added slowly and the reaction mixture was stirred at 250 rpm and 25° C. Gel formation started immediately upon contact with water and several agglomerates were formed. After 20 min the mixture was filtered, washed with water and the white, very voluminous solid was dried at 60° C. for 24 h. A transparent solid was formed.

EA: C 77.93, H 14.44, N 0

IR: n-octyl at $\nu$ ($CH_2$) 2951 $cm^{-1}$, 2905 $cm^{-1}$, $\delta$ (CH) 1430-1485 $cm^{-1}$, $\nu$ (Si—O—Si) 1106 $cm^{-1}$.

4.1.2 Synthesis of an LDPE/HDPE Microplastic Inclusion Compound 100 mg microplastic powder (LDPE/HDPE) (50 μm-300 μm) and 1 L distilled water were placed in a 2 L round-bottom flask and stirred vigorously (24 h swelling process). 43.2 μmol n-octyltrichlorosilane were added slowly and the reaction mixture was stirred at 250 rpm and 25° C. The silane initially formed small droplets which circulated in the vessel (localization). The droplets partially accumulated the microplastic particles (approx. 50%) within 3-4 min. Gel formation started directly upon contact with water and several agglomerates were formed which floated on the water surface (fixation). After 10 min 50% (mass balance) PE was bound and 50% unbound in the reaction vessel. The pH value of the water was 6-7. The mixture was stirred for 10 min more, then filtered, washed with water and dried for 24 h at 60° C. A transparent solid with bound white microplastic particles was formed.

EA: C 79.23, H 14.00, N 0

IR: PE $\nu$ ($CH_2$) 2920 2870 $cm^{-1}$ (R=n-octyl is superimposed $\nu$ ($CH_2$) 2951 $cm^{-1}$, 2905 $cm^{-1}$), $\delta$ (CH) 1430-1485 $cm^{-1}$, $\nu$ (Si—O—Si) 1106 $cm^{-1}$.

4.1.3 Synthesis of a PP Microplastic Inclusion Compound 100 mg microplastic powder (PP) (50 μm-300 μm) and 1 L distilled water were placed in a 2 L round-bottom flask and stirred vigorously (24 h swelling process). 43.2 μmol n-octyltrichlorosilane were added slowly. The reaction mixture was stirred at 250 rpm and 25° C. The silane initially formed small droplets, which circulated in the vessel (localization). The droplets accumulated the microplastic particles partially (approx. 50%) within 3-4 min. Gel formation started directly upon contact with water and several agglomerates were formed which floated on the water surface (fixation). After 10 min 50% (mass balance) PE was bound and 50% unbound in the reaction vessel. The pH value of the water was 6-7. The mixture was stirred for 10 min more, then filtered, washed with water and dried for 24 h at 60° C. A transparent solid with bound white microplastic particles was formed.

EA: C 76.80, H 14.05, N 0

IR: PP $\nu$ ($CH_2$) 2920 2870 $cm^{-1}$ (R=n-octyl is superimposed $\nu$ ($CH_2$) 2951 $cm^{-1}$, 2905 $cm^{-1}$, $\delta$ (CH) 1430-1485 $cm^{-1}$, $\nu$ (Si—O—Si) 1106 $cm^{-1}$.

4.1.4 Synthesis of a PE/PP Microplastic Inclusion Compound 100 mg microplastic powder (LDPE/HDPE/PP 0.5/0.5/1) (50 μm-300 μm) and 1 L distilled water were placed in a 2 L round-bottom flask and stirred vigorously (24 h swelling process). 43.2 μmol n-octyltrichlorosilane were added slowly and the reaction mixture was stirred at 250 rpm and 25° C. The silane initially formed small droplets, which circulated in the vessel (localization). The droplets partially accumulated the microplastic particles (approx. 50%) within 3-4 min. Gel formation started directly upon contact with water and several agglomerates were formed which floated on the water surface (fixation). After 10 min 50% (mass balance) of the microplastic mixture was bound and 50% was unbound in the reaction vessel. The pH value of the water was 6-7. The mixture was stirred for 10 min more, then filtered, washed with water and dried for 24 h at 60° C. A transparent solid with bound white microplastic particles was formed.

IR: PE/PP $\nu$ ($CH_2$) 2920 2870 $cm^{-1}$ (R=n-octyl is superimposed $\nu$ ($CH_2$) 2951 $cm^{-1}$, 2905 $cm^{-1}$, $\delta$ (CH) 1430-1485 $cm^{-1}$, $\nu$ (Si—O—Si) 1106 $cm^{-1}$.

4.2 Synthesis of a Microplastic Inclusion Compound Using n-Butyltrichlorosilane 4.2.1 Synthesis of a Hybrid Silica Gel Based on n-Butyltrichlorosilane 1 L distilled water was placed in a 2 L round-bottom flask and stirred vigorously. 60.5 μmol n-butyltrichlorosilane were added slowly and the reaction mixture was stirred at 250 rpm and 25° C. The silane formed small droplets which settled to the bottom. Gel formation started after 2 min and a large agglomerate was formed. After 20 min, the mixture was filtered, washed with water and the white solid was dried at 60° C. for 24 h. A white gel-like solid was formed.

EA: C 41.16, H 07.93, N 0

IR: n-butyl $\nu$ ($CH_2$) 2950 $cm^{-1}$-2870 $cm^{-1}$, $\delta$ (CH) 1465-1407 $cm^{-1}$, $\nu$ (Si—O—Si) 1202 $cm^{-1}$, $\nu$ (Si—O) 874-688 $cm^{-1}$.

4.2.2 Synthesis of a PE Microplastic Inclusion Compound 100 mg microplastic powder (LDPE/HDPE) (50 μm-300 μm) and 1 L distilled water were placed in a 2 L round-bottom flask and stirred vigorously (24 h swelling process). 60.5 μmol n-butyltrichlorosilane were added slowly and the reaction mixture was stirred at 250 rpm and 25° C. The silane initially formed small droplets, which circulated in the vessel (localization). The droplets accumulated the microplastic particles completely (approx. 75%) within 2-4 min. Gel formation started after 2 min and a large agglomerate was formed, which floated on the water surface (fixation). After 10 min 75% (mass balance) of PE was bound. The pH value of the water was 6-7. The mixture was stirred for another 10 min, then filtered, washed with water and dried for 24 h at 60° C. The result was a transparent solid with incorporated white microplastic particles.

EA: C 75.04, H 12.74, N 0

IR: PE $\nu$ ($CH_2$) 2920 2870 $cm^{-1}$ (R=n-butyl is superimposed $\nu$ ($CH_2$) 2951 $cm^{-1}$, 2905 $cm^{-1}$, $\delta$ (CH) 1430-1485 $cm^{-1}$, $\nu$ (Si—O—Si) 1106 $cm^{-1}$.

4.2.3 Synthesis of a PP Microplastic Inclusion Compound 100 mg microplastic powder (PP) (50 μm-300 μm) and 1 L distilled water were placed in a 2 L round-bottom flask and stirred vigorously (24 h swelling process). 60.5 μmol n-butyltrichlorosilane were added slowly and the reaction mixture was stirred at 250 rpm and 25° C. The silane initially formed small droplets which circulated in the vessel (localization). The droplets accumulated the microplastic particles completely (approx. 75%) within 2-4 min. Gel formation started after 2 min and a large agglomerate was formed, which floated on the water surface (fixation). After 10 min 100% (mass balance) PP was bound. The pH value of the water was 6-7. The mixture was stirred for another 10 min, then filtered, washed with water and dried for 24 h at 60° C. The result was a transparent solid with incorporated white microplastic particles.

EA: C 80.30, H 13.76, N 0

IR: PP ν ($CH_2$) 2920 2870 $cm^{-1}$ (R=n-butyl is superimposed ν ($CH_2$) 2951 $cm^{-1}$, 2905 $cm^{-1}$, δ (CH) 1430-1485 $cm^{-1}$, ν (Si—O—Si) 1106 $cm^{-1}$.

4.2.4 Synthesis of a PE/PP Microplastic Inclusion Compound 100 mg microplastic powder (LDPE/HDPE/PP; 0.5/0.5/1) (50 μm-300 μm) and 1 L distilled water were placed in a 2 L round-bottom flask and stirred vigorously (24 h swelling process). 60.5 μmol n-butyltrichlorosilane were added slowly and the reaction mixture was stirred at 250 rpm and 25° C. The silane initially formed small droplets, which circulated in the vessel (localization). The droplets accumulated the microplastic particles completely (approx. 75%) within 2-4 min. Gel formation started after 2 min and a large agglomerate was formed, which floated on the water surface (fixation). After 10 min 100% (mass balance) of the microplastic mixture was bound. The pH value of the water was 6-7. The mixture was stirred for 10 min more, then filtered, washed with water and dried for 24 h at 60° C. A transparent solid with incorporated white microplastic particles was formed.

EA: C 69.67, H 11.55, N 0

IR: PE/PP ν ($CH_2$) 2920 2870 $cm^{-1}$ (R=n-butyl is superimposed ν ($CH_2$) 2951 $cm^{-1}$, 2905 $cm^{-1}$, δ (CH) 1430-1485 $cm^{-1}$, ν (Si—O—Si) 1106 $cm^{-1}$.

4.3 Synthesis of a Microplastic Inclusion Compound Using Isobutyltrichlorosilane 4.3.1 Synthesis of a Hybrid Silica Gel Based on Isobutyltrichlorosilane 1 L distilled water was placed in a 2 L round-bottom flask and stirred vigorously. 60 μmol isobutyltrichlorosilane were added slowly and the reaction mixture was stirred at 250 rpm and 25° C. The silane formed small droplets and initially did not mix with water. Gel formation started after 6 min. After 10 min the trichlorosilane was completely converted to the hybrid silica gel and small aggregates were visible. After 20 minutes the aggregates increased in size. The size of the aggregates was 1-3 mm. The mixture was filtered, washed with water and the white solid was dried at 60° C. for 24 h. The result was a white solid.

EA (found): C 40.64, H 08.17, N 0

REM EDX: C 47.92, O 37.734, Si 14.35.

IR: ν ($CH_2$) 2953 $cm^{-1}$, 2869 $cm^{-1}$, δ (CH) 1465-1401 $cm^{-1}$, ν (Si—O—Si) 1128 $cm^{-1}$-997, ν (Si—O) 835-737-$cm^{-1}$.

4.3.2 Synthesis of a PE Microplastic Inclusion Compound 100 mg microplastic powder (LDPE/HDPE) (50 μm-300 μm) and 1 L distilled water were placed in a 2 L round-bottom flask and stirred vigorously (24 h swelling process). 60 μmol isobutyltrichlorosilane were added slowly. The reaction mixture was stirred at 250 rpm and 25° C. The silane initially formed small droplets, which circulated in the vessel (localization). The droplets accumulated the microplastic particles completely (approx. 100%) within 2-4 min. Gel formation started after 6 min and a large agglomerate was formed. After 10 min the trichlorosilane was completely converted to hybrid silica gel and small aggregates with the bound PE (100% mass balance) were visible. After 20 minutes the aggregates increased in size (2-3 mm) and floated on the water surface (fixation). The pH-value of the water was 6-7. The mixture was then filtered, washed with water and dried for 24 h at 60° C. The result was a white solid with incorporated white microplastic particles.

EA (found): C 76.36, H 14.15, N 0

REM EDX (found): C 47.92, O 37.734, Si 14.35.

IR: PE ν ($CH_2$) 2920 2870 $cm^{-1}$ (R=isobutyl is superimposed ν ($CH_2$) 2951 $cm^{-1}$, 2905 $cm^{-1}$, δ (CH) 1430-1485 $cm^{-1}$, ν (Si—O—Si) 1106 $cm^{-1}$.

4.3.3 Synthesis of a PP Microplastic Inclusion Compound 100 mg microplastic powder (PP) (50 μm-300 μm) and 1 L distilled water were placed in a 2 L round-bottom flask and stirred vigorously (24 h swelling process). 60 μmol isobutyltrichlorosilane were added slowly and the reaction mixture was stirred at 250 rpm and 25° C. The silane initially formed small droplets which circulated in the vessel (localization). The droplets accumulated the microplastic particles completely (approx. 100%) within 2-4 min. Gel formation started after 6 min and a large agglomerate was formed. After 10 min the trichlorosilane was completely converted to the hybrid silica gel and small aggregates with the bound PP (100% mass balance) were visible. After 20 minutes the aggregates increased in size (2-3 mm) and floated on the water surface (fixation). The pH-value of the water was 6-7. The mixture was then filtered, washed with water and dried for 24 h at 60° C. The result was a white solid with incorporated white microplastic particles.

EA (found): C 73.72, H 13.46, N 0

REM EDX (found): C 72.2, O 24.27, Si 3.53.

IR: PP ν ($CH_2$) 2920 2870 $cm^{-1}$ (R=isobutyl is superimposed ν ($CH_2$) 2951 $cm^{-1}$, 2905 $cm^{-1}$, δ (CH) 1430-1485 $cm^{-1}$, ν (Si—O—Si) 1106 $cm^{-1}$.

4.3.4: Synthesis of a PE/PP Microplastic Inclusion Compound 100 mg microplastic powder (LDPE/HDPE/PP, 05/0.5/1) (50 μm-300 μm) and 1 L distilled water were placed in a 2 L round-bottom flask and stirred vigorously (24 h swelling process). 60 μmol isobutyltrichlorosilane were added slowly and the reaction mixture was stirred at 250 rpm and 25° C. The silane initially formed small droplets which circulated in the vessel (localization). The droplets accumulated the microplastic particles completely (approx. 100%) within 2-4 min. Gel formation started after 6 min and a large agglomerate was formed. After 10 min the trichlorosilane was completely converted to the hybrid silica gel and small aggregates with the bound microplastic mixture (100% mass balance) were visible. After 20 minutes the aggregates increased in size (2-3 mm) and floated on the water surface (fixation). The pH value of the water was 6-7. The mixture was then filtered, washed with water and dried for 24 h at 60° C. The result was a white solid with incorporated white microplastic particles.

EA (found): C 75.54, H 13.63, N 0

REM EDX (found): C 46.04, O 40.51, Si 13.452.

IR: PE/PP ν ($CH_2$) 2920 2870 $cm^{-1}$ (R=isobutyl is superimposed ν ($CH_2$) 2951 $cm^{-1}$, 2905 $cm^{-1}$, δ (CH) 1430-1485 $cm^{-1}$, ν (Si—O—Si) 1106 $cm^{-1}$.

4.4 Synthesis of a Microplastic Inclusion Compound Using Isooctyltrichlorosilane 4.4.1 Synthesis of a Hybrid Silica Gel Based on Isooctyltrichlorosilane 1 L distilled water was placed in a 2 L round-bottom flask and stirred vigorously. 43 μmol isooctyltrichlorosilane were added slowly and the reaction mixture was stirred at 250 rpm and 25° C. The silane formed small droplets and initially did not mix with water and sank to the bottom. After 5-10 s the gel formation started and a large aggregate became visible, floating on the water surface. After 10 min the trichlorosilane was completely converted to the hybrid silica gel and small aggregates were visible. A white gel was formed. After 20 minutes the aggregates increased in size. The size of the aggregates was 1-3 mm. The mixture was filtered, washed with water and the white solid was dried at 60° C. for 24 h. The result was a white solid.

EA (found): C 40.85, H 08.30, N 0
REM EDX (found): C 49.43, O 40.16, Si 10.41.
IR: Isooctyl $\nu$ ($CH_2$) 2951 $cm^{-1}$, 2905 $cm^{-1}$, $\delta$ (CH) 1430-1485 $cm^{-1}$, $\nu$ (Si—O—Si) 1106 $cm^{-1}$.

4.4.2 Synthesis of a PE Microplastic Inclusion Compound 100 mg microplastic powder (LDPE/HDPE) (50 μm-300 μm) and 1 L distilled water were placed in a 2 L round-bottom flask and stirred vigorously (24 h swelling process). 43 μmol isooctyltrichlorosilane were added slowly and the reaction mixture was stirred at 250 rpm and 25° C. The silane initially formed small droplets which circulated in the vessel (localization). The droplets accumulated the microplastic particles completely (approx. 100%) within 2-4 min. Gel formation started after 5-10 s and a large agglomerate was formed. After 10 min the trichlorosilane was completely converted to the hybrid silica gel and small aggregates with the bound PE (100% mass balance) were visible. After 20 minutes the aggregates increased in size (2-3 mm) and floated on the water surface (fixation). The pH-value of the water was 6-7. The mixture was then filtered, washed with water and dried for 24 h at 60° C. The result was a white solid with incorporated white microplastic particles.

EA (found): C 70.96, H 14.57, N 0
REM EDX (found): C 79.55, O 15.79, Si 4.65.
IR: PE $\nu$ ($CH_2$) 2920 2870 $cm^{-1}$ (R=isooctyl is superimposed $\nu$ ($CH_2$) 2951 $cm^{-1}$, 2905 $cm^{-1}$), $\delta$ (CH) 1430-1485 $cm^{-1}$, $\nu$ (Si—O—Si) 1106 $cm^{-1}$.

4.4.3 Synthesis of a PP Microplastic Inclusion Compound 100 mg microplastic powder (PP) (50 μm-300 μm) and 1 L distilled water were placed in a 2 L round-bottom flask and stirred vigorously (24 h swelling process). 43 μmol isooctyltrichlorosilane were added slowly and the reaction mixture was stirred at 250 rpm and 25° C. The silane initially formed small droplets which circulated in the vessel (localization). The droplets accumulated the microplastic particles completely (approx. 100%) within 2-4 min. Gel formation started after 5-10 s and a large agglomerate was formed. After 10 min the trichlorosilane was completely converted to the hybrid silica gel and small aggregates with the bound PE (100% mass balance) were visible. After 20 minutes the aggregates increased in size (2-3 mm) and floated on the water surface (fixation). The pH-value of the water was 6-7. The mixture was then filtered, washed with water and dried for 24 h at 60° C. The result was a white solid with incorporated white microplastic particles.

EA (found): C 74.95, H 13.59, N 0
REM EDX (found): C 67.56, O 26.6, Si 5.84.
IR: PP $\nu$ ($CH_2$) 2920 2870 $cm^{-1}$ (R=isooctyl is superimposed $\nu$ ($CH_2$) 2951 $cm^{-1}$, 2905 $cm^{-1}$, $\delta$ (CH) 1430-1485 $cm^{-1}$, $\nu$ (Si—O—Si) 1106 $cm^{-1}$.

4.4.4 Synthesis of a PE/PP Microplastic Inclusion Compound 100 mg microplastic powder (LDPE/HDPE/PP, 0.5/0.5/1) (50 μm-300 μm) and 1 L distilled water were placed in a 2 L round-bottom flask and stirred vigorously (24 h swelling process). 43 μmol isooctyltrichlorosilane were added slowly. The reaction mixture was stirred at 250 rpm and 25° C. The silane initially formed small droplets, which circulated in the vessel (localization). The droplets completely accumulated the microplastic particles (approx. 100%) within 2-4 min. Gel formation started after 5-10 s and a large agglomerate was formed. After 10 min the trichlorosilane was completely converted to the hybrid silica gel and small aggregates with the bound microplastic mixture (100% mass balance) were visible. After 20 minutes the aggregates increased in size (2-3 mm) and floated on the water surface (fixation). The pH value of the water was 6-7. The mixture was then filtered, washed with water and dried for 24 h at 60° C. The result was a white solid with incorporated white microplastic particles.

EA (found): C 78.21, H 14.31, N 0
REM EDX (found): C 62.66, O 29.85, Si 7.485.
IR: PE/PP $\nu$ ($CH_2$) 2920 2870 $cm^{-1}$ (R=isooctyl is superimposed $\nu$ ($CH_2$) 2951 $cm^{-1}$, 2905 $cm^{-1}$, $\delta$ (CH) 1430-1485 $cm^{-1}$, $\nu$ (Si—O—Si) 1106 $cm^{-1}$.

4.5 Synthesis of a Microplastic Inclusion Compound Using Isooctyl-$T_8$-Polyoctahedral Silsesquioxane 4.5.1 Synthesis of a Hybrid Silica Gel Based on Isooctyl-T8-Polyoctahedral Silsesquioxane 1 L distilled water was placed in a 2 L round-bottom flask and stirred vigorously. 7.64 μmol isooctyl-$T_8$-polyoctahedral silsesquioxane were added slowly. The reaction mixture was stirred at 250 rpm and 25° C. The highly viscous silane formed small droplets and did not mix with water and floated up. Upon contact with water no visible hybrid silica gel was formed at first. A change in color could be detected by strong mixing. The substance changed from slightly yellowish to a whitish transparent highly viscous liquid. The gel was filtered, washed with water and dried at 60° C. for 24 h. The result was a whitish transparent highly viscous liquid.

EA (found): C 57.02, H 10.41
IR: Isooctyl $\nu$ ($CH_2$) 2951 $cm^{-1}$, 2905 $cm^{-1}$, $\delta$ (CH) 1430-1485 $cm^{-1}$, $\nu$ (Si—O—Si) 1106 $cm^{-1}$.

4.5.2 Synthesis of a PE Microplastic Inclusion Compound 100 mg microplastic powder (LDPE/HDPE) (50 μm-300 μm) and 1 L distilled water were placed in a 2 L round-bottom flask and stirred vigorously (24 h swelling process). 7.64 μmol isooctyl-$T_8$-polyoctahedral silsesquioxane were added slowly. The reaction mixture was stirred at 250 rpm and 25° C. The silane initially formed small droplets which circulated in the vessel (localization). The droplets accumulated the microplastic particles completely (approx. 100%) within 2-4 min. Gel formation started after 5-6 min, wherein the color of the liquid changed from slightly yellowish to white. After 5-6 min a large agglomerate with the bound PE (100% mass balance) was visible. The pH value of the water was 6-7. The agglomerate was then filtered, washed with water and dried for 24 h at 60° C. The result was a white, highly viscous liquid with incorporated white microplastic particles.

EA (found): C 69.51, H 12.18, N 0
REM EDX (found): C 63.13, O 24.26, Si 12.37
IR: PE $\nu$ ($CH_2$) 2920 2870 $cm^{-1}$ (R=isooctyl is superimposed $\nu$ ($CH_2$) 2951 $cm^{-1}$, 2905 $cm^{-1}$), $\delta$ (CH) 1430-1485 $cm^{-1}$, $\nu$ (Si—O—Si) 1106 $cm^{-1}$.

4.5.3 Synthesis of a PP Microplastic Inclusion Compound 100 mg microplastic powder (PP) (50 μm-300 μm) and 1 L distilled water were placed in a 2 L round-bottom flask and stirred vigorously (24 h swelling process). 7.64 μmol isooctyl-18-polyoctahedral silsesquioxane were added slowly and the reaction mixture was stirred at 250 rpm and 25° C. The silane initially formed small droplets, which circulated in the vessel (localization). The droplets accumulated the microplastic particles completely (approx. 100%) within 2-4 min. Gel formation started after 5-6 min. and the color of the liquid changed from slightly yellowish to white. After 5-6 min a large agglomerate with the bound PP (100% mass balance) was visible. The pH value of the water was 6-7. The agglomerate was then filtered, washed with water and dried for 24 h at 60° C. The result was a white, highly viscous liquid with incorporated white microplastic particles.

EA (found): C 75.30, H 13.22, N 0

REM EDX (found): C 63.5, O 20.92, Si 15.58.

IR: PP ν ($CH_2$) 2920-2870 $cm^{-1}$ (R=isooctyl is superimposed ν ($CH_2$) 2951 $cm^{-1}$, 2905 $cm^{-1}$), δ (CH) 1430-1485 $cm^{-1}$, ν (νSi—O—Si) 1106 $cm^{-1}$.

4.5.4 Synthesis of a PE/PP Microplastic Inclusion Compound 100 mg microplastic powder (LDPE/HDPE/PP, 0.5/0.5/1) (50 μm-300 μm) and 1 L distilled water were placed in a 2 L round-bottom flask and stirred vigorously (24 h swelling process). 7.64 μmol isooctyl-$T_8$-polyoctahedral silsesquioxane were added slowly. The reaction mixture was stirred at 250 rpm and 25° C. The silane initially formed small droplets which circulated in the vessel (localization). The droplets accumulated the microplastic particles completely (approx. 100%) within 2-4 min. Gel formation started after 5-6 min, whereby the color of the liquid changed from slightly yellowish to white. After 5-6 min a large agglomerate with the bound microplastic mixture (100% mass balance) was visible. The pH value of the water was 6-7. The agglomerate was then filtered, washed with water and dried for 24 h at 60° C. The result was a white, highly viscous liquid/solid with incorporated white microplastic particles.

EA (found): C 77.75, H 13.86, N 0

REM EDX (found): C 63.43, O 21.38, Si 15.19.

IR: PE/PP ν ($CH_2$) 2920-2870 $cm^{-1}$ (R=isooctyl is superimposed ν ($CH_2$) 2951 $cm^{-1}$, 2905 $cm^{-1}$), δ (CH) 1430-1485 $cm^{-1}$, ν (Si—O—Si) 1106 $cm^{-1}$.

4.6 Synthesis of a Microplastic Inclusion Compound Using Isooctyl-$T_8$-Polyoctahedral Silsesquioxane in 2000 L Pilot Scale 4.6.1 Synthesis of a PE Microplastic Inclusion Compound 100 g microplastic powder (LDPE/HDPE) (150 μm-300 μm) and 2000 L process water (secondary settling tank) were filled into a discontinuous 2000 L batch reactor. Subsequently, at an outside temperature (15-20° C.), the mixture was stirred for 24 h at 250 rpm (swelling process). The agglomeration method was started by adding 7.64 mmol of isooctyl-$T_8$-polyoctahedral silsesquioxane and stirring the mixture for 24 h at an outside temperature (15-20° C.) and 250 rpm. The mixture was filtered and the white agglomerates were dried at 60° C. for 24 h. The white agglomerates had a diameter of 2-6 cm.

IR: PE ν ($CH_2$) 2920-2870 $cm^{-1}$ (R=isooctyl is superimposed ν ($CH_2$) 2951 $cm^{-1}$, 2905 $cm^{-1}$), δ (CH) 1430-1485 $cm^{-1}$, ν (Si—O—Si) 1106 $cm^{-1}$.

4.6.2 Synthesis of a PP Microplastic Inclusion Compound 100 g microplastic powder (PP) (150 μm-300 μm) and 2000 L process water (secondary settling tank) were filled into a discontinuous 2000 L batch reactor. Subsequently, at an outside temperature (15-20° C.), the mixture was stirred for 24 h at 250 rpm (swelling process). The agglomeration method was started by adding 7.64 mmol of isooctyl-$T_8$-polyoctahedral silsesquioxane and stirring the mixture for 24 h at an outside temperature (15-20° C.) and 250 rpm. The mixture was filtered and the white agglomerates were dried at 60° C. for 24 h. The white agglomerates had a diameter of 2-6 cm.

IR: PE ν ($CH_2$) 2920-2870 $cm^{-1}$ (R=isooctyl is superimposed ν ($CH_2$) 2951 $cm^{-1}$, 2905 $cm^{-1}$), δ (CH) 1430-1485 $cm^{-1}$, ν (Si—O—Si) 1106 $cm^{-1}$.

4.6.3 Synthesis of a PE/PP Microplastic Inclusion Compound 100 g microplastic powder (LDPE/HDPE/PP, 0.5/0.5/1) (150 μm-300 μm) and 2000 L process water (secondary clarifier) were filled into a discontinuous 2000 L batch reactor. Subsequently, at an outside temperature (15-20° C.), the mixture was stirred for 24 h at 250 rpm (swelling process). The agglomeration method was started by adding 7.64 mmol of isooctyl-$T_8$-polyoctahedral silsesquioxane and stirring the mixture for 24 h at an outside temperature (15-20° C.) and 250 rpm. The mixture was filtered and the white agglomerates were dried at 60° C. for 24 h. The white agglomerates had a diameter of 2-6 cm.

IR: PE ν ($CH_2$) 2920-2870 $cm^{-1}$ (R=isooctyl is superimposed ν ($CH_2$) 2951 $cm^{-1}$, 2905 $cm^{-1}$), δ (CH) 1430-1485 $cm^{-1}$, ν (Si—O—Si) 1106 $cm^{-1}$.

The invention claimed is:

1. A method for the removal of microplastic particles from water and/or a body of water, the method having the following steps:
   (a) dosing or adding an alkyltrichlorosilane of the following formula I

   $$R—SiCl_3 \qquad \text{(formula I)},$$

wherein
   R represents an alkyl group, Si represents a silicon atom and Cl represents a chlorine atom,
   and/or
   dosing or adding a silsesquioxane of the following formula II

   $$[RSiO_{3/2}]_n \qquad \text{(formula II)},$$

wherein
   R represents an alkyl group,
   Si represents a silicon atom,
   O represents an oxygen atom and n represents an integer, to a microplastic particle-containing water and/or a microplastic particle-containing body of water, and
   (b) removing, from the water and/or the body of water, inclusion compounds formed after addition of the alkyltrichlorosilane and/or the silsesquioxane, wherein the inclusion compounds each comprise a hybrid silica gel and microplastic particles, wherein the hybrid silica gel is formed by reaction of the alkyltrichlorosilane and/or of the silsesquioxane in the water and/or body of water and encloses the microplastic particles at least partially.

2. The method as claimed in claim 1, wherein the alkyltrichlorosilane is a carrier-free alkyltrichlorosilane and/or the silsesquioxane is a carrier-free silsesquioxane.

3. The method as claimed in claim 1, wherein R of the alkyltrichlorosilane of the formula I and/or R of the silsesquioxane of the formula II is an alkyl group having 1 carbon atom to 16 carbon atoms.

4. The method as claimed in claim 3, wherein R of the alkyltrichlorosilane of the formula I and/or R of the silsesquioxane of the formula II is an alkyl group having 3 carbon atoms to 14 carbon atoms or 4 carbon atoms to 8 carbon atoms.

5. The method as claimed in claim 1, wherein R of the alkyltrichlorosilane of the formula I and/or R of the silsesquioxane of the formula II is a linear alkyl group.

6. The method as claimed in claim 1, wherein R of the alkyltrichlorosilane of the formula I and/or R of the silsesquioxane of the formula II is a branched alkyl group.

7. The method as claimed in claim 1, wherein R of the alkyltrichlorosilane of the formula I and/or R of the silsesquioxane of the formula II is selected from the group consisting of n-butyl group, isobutyl group, hexyl group, isohexyl group, 2,4,4-trimethylpentyl group, n-octyl group, 6-methylheptyl group, nonyl group, decyl group, dodecyl group, tetradecyl group and hexadecyl group.

8. The method as claimed in claim 1, wherein R of the alkyltrichlorosilane of the formula I and/or R of the silsesquioxane of the formula II is selected from the group consisting of n-butyl group, isobutyl group, n-octyl group and 2,4,4-trimethylpentyl group.

9. The method as claimed in claim 1, wherein the silsesquioxane comprises at least two different alkyl groups.

10. The method as claimed in claim 9, wherein the at least two different alkyl groups are selected from the group consisting of n-butyl group, isobutyl group, hexyl group, isohexyl group, 2,4,4-trimethylpentyl group, n-octyl group, 6-methylheptyl group, nonyl group, decyl group, dodecyl group, tetradecyl group and hexadecyl group.

11. The method as claimed in claim 1, wherein the alkyltrichlorosilane is a pure substance or a mixture of different alkyltrichlorosilanes and/or the silsesquioxane is a pure substance or a mixture of different silsesquioxanes.

12. The method as claimed in claim 1, wherein n represents an integer from 4 to 16.

13. The method as claimed in claim 12, wherein n represents an integer from 6 to 14 or from 6 to 12.

14. The method as claimed in claim 1, wherein n represents the integer 6, 8, 10 or 12.

15. The method as claimed in claim 1, wherein the silsesquioxane is a silsesquioxane of the following formula III:

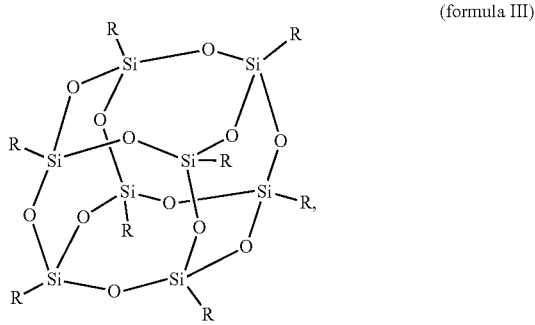
(formula III)

wherein

R represents an alkyl group, Si represents a silicon atom and O represents an oxygen atom.

16. The method as claimed in claim 1, wherein the microplastic particles have a mean diameter of 100 nm to 5 mm.

17. The method as claimed in claim 16, wherein the mean diameter is 10 µm to 5 mm or 100 µm to 1 mm.

18. The method as claimed in claim 1, wherein the microplastic particles comprise a plastic or consist of a plastic which is selected from the group consisting of polyethylene, polypropylene, polystyrene, polyvinyl chloride, polyurethane, polyamide, polycarbonate, polytetrafluoroethylene, polyoxymethylene, acrylonitrile-butadiene-styrene copolymer, polyethylene terephthalate, polymethyl methacrylate, polyacrylonitrile, copolymers of at least two of said plastics and combinations of at least two of said plastics.

19. An inclusion compound, comprising a hybrid silica gel and microplastic particles, wherein the hybrid silica gel is formed in water and/or body of water by reaction of an alkyltrichlorosilane of the following formula I R—SiCl$_3$ (formula I), wherein R represents an alkyl group, Si represents a silicon atom and Cl represents a chlorine atom, and/or by a silsesquioxane of the following formula II

[RSiO$_{3/2}$]$_n$ (formula II), wherein

R represents an alkyl group, Si represents a silicon atom, O represents an oxygen atom and n represents an integer, and the hybride silica gel at least partially encloses the microplastic particles.

* * * * *